(12) United States Patent
Sitz

(10) Patent No.: US 11,144,076 B2
(45) Date of Patent: Oct. 12, 2021

(54) FLUID FLOW CONTROL BASED ON A LIQUID LEVEL IN A CONTAINER

(71) Applicant: Justin C. Sitz, Bryan, TX (US)

(72) Inventor: Justin C. Sitz, Bryan, TX (US)

(*) Notice: Subject to any disclaimer, the term of this patent is extended or adjusted under 35 U.S.C. 154(b) by 17 days.

(21) Appl. No.: 16/231,192

(22) Filed: Dec. 21, 2018

(65) Prior Publication Data

US 2020/0201366 A1 Jun. 25, 2020

(51) Int. Cl.
*G05D 9/02* (2006.01)
*G05D 9/12* (2006.01)

(52) U.S. Cl.
CPC ............. *G05D 9/02* (2013.01); *G05D 9/12* (2013.01); *Y10T 137/0324* (2015.04)

(58) Field of Classification Search
CPC ......... Y10T 137/7323; Y10T 137/7319; Y10T 137/7316; Y10T 137/7326; Y10T 137/7313; Y10T 137/0318; Y10T 137/0324; G05D 9/02; G05D 9/12; A01G 9/24; A01G 27/00; A01G 27/02; A01G 27/003; A01G 25/00; A01G 25/16; A01G 25/167; F16K 31/18; F16K 31/34; F16K 31/265; F16K 31/365–3855; A01K 39/02; A01K 39/024; A01K 39/026; A01K 39/04
USPC ... 137/398, 236.1, 132, 135, 151, 78.2, 1, 2; 239/63, 207, 200, 201, 70, 71, 64, 562; 47/48.5, 1 R, 79–82; 405/36–51; 4/508
See application file for complete search history.

(56) References Cited

U.S. PATENT DOCUMENTS

| | | | |
|---|---|---|---|
| 2,062,755 A * | 12/1936 | Lyons | A01G 31/02 47/62 C |
| 2,084,005 A | 6/1937 | Richards | |
| 2,198,150 A * | 4/1940 | Barnhart | A01G 31/02 47/62 R |
| 2,818,877 A * | 1/1958 | Swanson | A01G 27/001 137/135 |
| 3,168,797 A | 2/1965 | Patassy | |

(Continued)

FOREIGN PATENT DOCUMENTS

| | | |
|---|---|---|
| CN | 102144524 A | 8/2011 |
| CN | 105145286 A | 12/2015 |

(Continued)

OTHER PUBLICATIONS

English translation for JP2014-187985A to Kubota, Inventor, Hirao et al. taken from the Japanese Patent office patent search site, Japan Platform for Patent information, [retrieved from https://www.j-platpat.inpit.go.jp/p0200] ; retrieved on Dec. 17, 2020.*

(Continued)

*Primary Examiner* — Craig J Price
(74) *Attorney, Agent, or Firm* — Kunzler Bean & Adamson, PC

(57) ABSTRACT

Apparatuses, systems, and methods are disclosed for fluid flow control. A container is shaped to receive a liquid, and includes an outlet configured to allow the liquid to exit the container. A valve is configured to control a fluid flow based on a liquid level in the container. An output line coupled to the valve is configured to convey the fluid flow from the valve to a location outside the container. The location outside the container does not receive the liquid directly from the outlet.

17 Claims, 10 Drawing Sheets

(56) References Cited

U.S. PATENT DOCUMENTS

| | | | |
|---|---|---|---|
| 3,408,818 A | 11/1968 | Hemphill | |
| 3,748,898 A * | 7/1973 | Hellouin de Menibus | ............... F15B 19/00 73/168 |
| 3,778,928 A * | 12/1973 | Green | ............ A01G 27/06 47/80 |
| 4,065,926 A | 1/1978 | Brandt | |
| 4,083,147 A | 4/1978 | Garrick | |
| 4,261,290 A | 4/1981 | Renaud | |
| 4,281,625 A | 8/1981 | Kasai | |
| 4,590,960 A | 5/1986 | Koble, Jr. | |
| 4,685,827 A | 8/1987 | Sibbel | |
| 4,864,771 A | 9/1989 | Fah | |
| 4,967,789 A | 11/1990 | Kypris | |
| 5,192,426 A | 3/1993 | DeCoster et al. | |
| 5,853,125 A | 12/1998 | Murray | |
| 5,944,444 A | 8/1999 | Motz et al. | |
| 6,178,984 B1 * | 1/2001 | Amsellem | ......... A01G 27/005 137/142 |
| 6,378,779 B1 | 4/2002 | Taylor | |
| 7,730,665 B2 * | 6/2010 | Tran | ............ A01G 27/005 47/66.6 |
| 7,874,312 B1 * | 1/2011 | Gibbs | ............ F16K 31/26 137/426 |
| 8,127,491 B1 | 3/2012 | Voigt, III et al. | |
| 8,726,568 B2 * | 5/2014 | Wilson | ............ A01G 22/00 47/62 R |
| 9,681,612 B2 * | 6/2017 | Li | ............ A01G 27/005 |
| 2004/0139650 A1 | 7/2004 | Haq | |
| 2007/0267515 A1 | 11/2007 | Sargent | |
| 2010/0024295 A1 | 2/2010 | Murray | |
| 2011/0016781 A1 | 1/2011 | Richardson | |
| 2015/0359185 A1 | 12/2015 | Guy | |
| 2017/0042101 A1 | 2/2017 | Soltani | |
| 2017/0052547 A1 * | 2/2017 | Thomson | ............ F16K 31/26 |
| 2017/0265406 A1 | 9/2017 | Carvalho | |

FOREIGN PATENT DOCUMENTS

| | | |
|---|---|---|
| GB | 2074295 A | 10/1981 |
| GB | 2357687 A | 7/2001 |
| JP | 2014187985 A | 10/2014 |
| KR | 20120082753 A | 7/2012 |

OTHER PUBLICATIONS

Phene, et al., "Low Pressure Drip Irrigation—Concept and Description", Paper #1060, pp. 1-9.

Baseline Inc., "Watering With Soil Moisture Sensors", 2011, pp. 1-28.

International Application No. PCT/US19/68411, Notification of Transmittal of the International Search Report and the Written Opinion of the International Searching Authority, dated Mar. 4, 2020, pp. 1-47.

* cited by examiner

FLUID FLOW CONTROL BASED ON A LIQUID LEVEL IN A CONTAINER

FIELD

This invention relates to fluid flow control and more particularly relates to fluid flow control based on a liquid level in a container.

BACKGROUND

Valves control fluid flow for a variety of applications, such as for irrigation, or for filling or topping up livestock tanks, ponds, pools, industrial fluid tanks, or the like. However, varying circumstances may call for varying amounts of fluid flow at varying times, or for varying durations. For example, when the weather has been dry or warm, it may be desirable to irrigate plants more often, or for longer durations, or at different times. Manual valve control to adjust fluid delivery for varying circumstances may be time-consuming or burdensome. More complex valve control systems may use electricity to actuate valves, to communicate with sensors that determine local circumstances, or the like, and may not be usable if electrical power is not available. For example, a new home may be constructed with an electrically controlled sprinkler system, but the electrically controlled sprinkler system may not be usable to water already-installed landscaping until after a final electrical inspection.

SUMMARY

Apparatuses are disclosed for fluid flow control. In one embodiment, a container is shaped to receive a liquid, and includes an outlet configured to allow the liquid to exit the container. In a certain embodiment, a valve is configured to control a fluid flow based on a liquid level in the container. In a further embodiment, an output line coupled to the valve is configured to convey the fluid flow from the valve to a location outside the container. In certain embodiments, the location outside the container does not receive the liquid directly from the outlet.

In one embodiment, a return line coupled to the output line is configured to divert a portion of the fluid flow from the output line into the container. In a certain embodiment, a branch connector couples the return line to the output line between the valve and the location outside the container. In some embodiments, the return line is coupled to the output line after the location outside the container, such that fluid not used at the location is returned to the container.

In one embodiment, a return flow control device is disposed in fluid communication with the return line to control a fill rate for the container. In certain embodiments, an output flow control device is disposed in fluid communication with the output line to control an output rate for delivering fluid to the location.

In one embodiment, the container includes a primary tank and a secondary tank in fluid communication with the primary tank. In a further embodiment, the secondary tank includes a drain port. In one embodiment, the secondary tank receives the diverted portion of the fluid flow.

In certain embodiments, one or more sprinklers are coupled to the output line. In some embodiments, the outlet includes an opening configured to allow the liquid to exit the container via evaporation. In some embodiments, an outlet includes a user-adjustable aperture configured to adjust an evaporation rate. In some embodiments, an outlet includes a mesh covering the outlet.

In one embodiment, an apparatus is configured to be disposed in ground. In a further embodiment, the outlet includes a permeable material configured to allow the liquid to pass between the container and the ground. In some embodiments, a sleeve shaped to receive the container is configured to be disposed in ground.

In one embodiment the outlet includes a manual override for the container. In a certain embodiment, a manual override includes a drain valve operable by a user to drain the container and/or a fill valve operable by a user to fill the container.

In one embodiment, a liquid level indicator indicates the liquid level in the container. In a certain embodiment, a valve latch is configured to delay the valve from opening in response to a temperature exceeding a threshold. In some embodiments, the valve is mechanically actuated based on the liquid level, such that the apparatus does not use electricity.

Systems are disclosed for fluid flow control. In one embodiment, a system includes a portable receptacle. In a further embodiment, a container disposed in the portable receptacle is shaped to receive a liquid, and includes an outlet configured to allow the liquid to exit the container. In a certain embodiment, a valve disposed in the portable receptacle is configured to control a fluid flow based on a liquid level in the container. In a further embodiment, an output line coupled to the valve is configured to convey the fluid flow from the valve to a location outside the container. In certain embodiments, the location outside the container does not receive the liquid directly from the outlet.

In one embodiment, a return line is coupled to the output line at a return location outside the container. In a further embodiment the return line is configured to divert a portion of the fluid flow from the output line into the container. In one embodiment, one or more sprinklers are coupled to the output line.

Methods are disclosed for fluid flow control. In one embodiment, a method includes receiving a liquid in a container. In a further embodiment, the container includes an outlet. In one embodiment, a method includes allowing the liquid to exit the container via the outlet. In a certain embodiment, a method includes actuating a valve based on a liquid level in the container, to control a fluid flow. In a further embodiment, a method includes using an output line coupled to the valve to convey the fluid flow from the valve to a location outside the container. In certain embodiments, the location outside the container does not receive the liquid directly from the outlet.

In one embodiment, a method includes using a return line coupled to the output line to divert a portion of the fluid flow from the output line into the container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
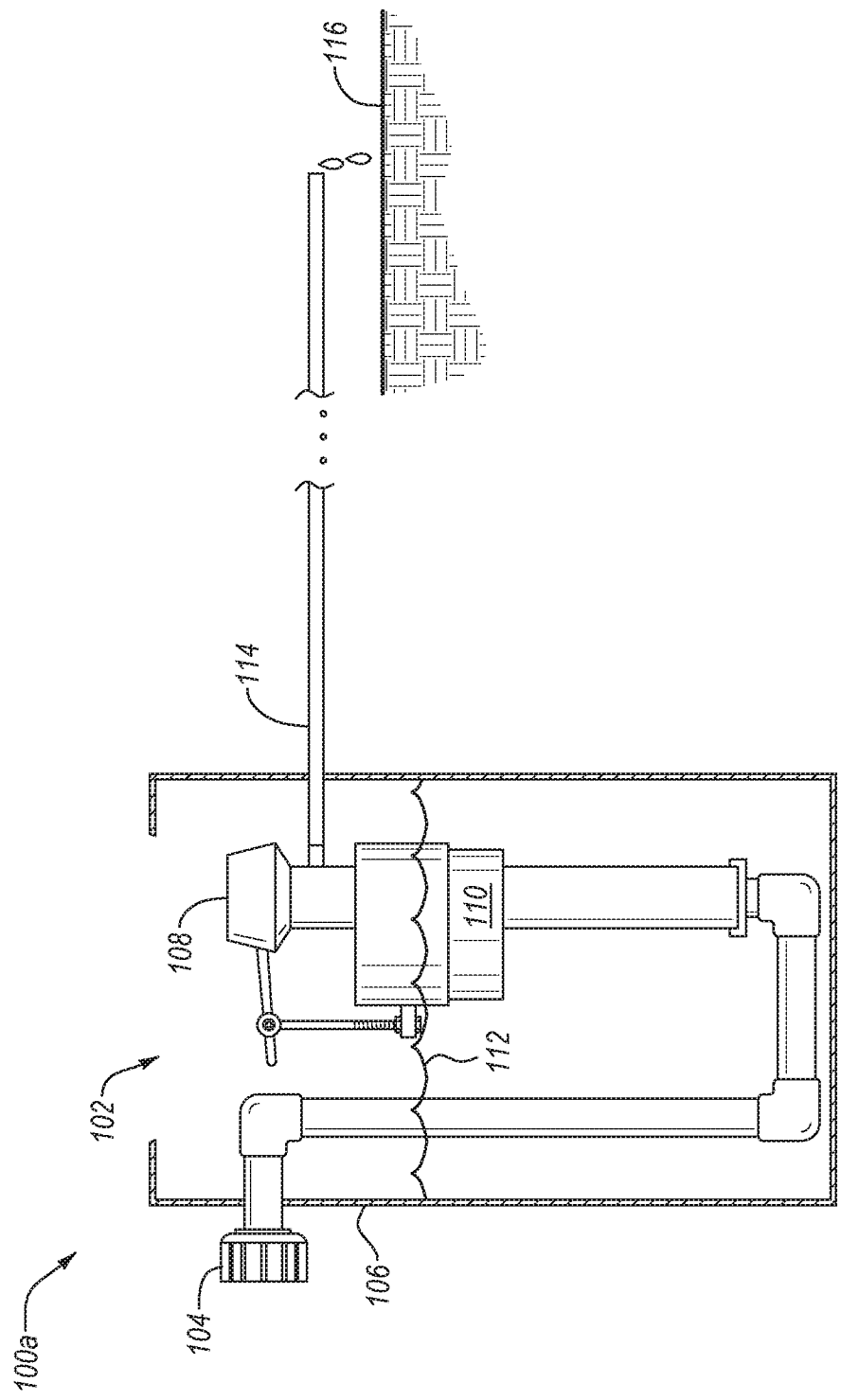
FIG. 1 is a side view illustrating one embodiment of an apparatus for fluid flow control.

FIG. 1 depicts one embodiment of an apparatus 100a for fluid flow control. In the depicted embodiment, the apparatus 100a includes a container 106, a valve 108, and an output line 114, which are described below.

In various embodiments, an apparatus 100 for fluid flow control, such as the apparatuses 100a-f of FIGS. 1-6, may use a valve 108 to control a fluid flow based on a liquid level 112 in a container 106. The container 106 may receive a liquid, and may include an outlet 102 allowing the liquid to exit the container 106. An output line 114 may convey the fluid flow to a location 116 that is outside the container 106, and that does not receive liquid directly from the outlet 102.

In some embodiments, using an apparatus 100 that controls fluid flow to a location 116 based on a liquid level 112 in a container 106 may avoid time-consuming or burdensome manual valve control. For example, if the valve 108 controls a flow of water, for irrigation, for filling up a livestock tank, for filling a pool, or the like, evaporation of water in the container 106 may lower the liquid level 112 so that the valve 108 turns the flow of water on. Subsequently, water entering the container 106 from precipitation, from sprinklers, or from a return line (not shown in FIG. 1) may raise the liquid level 112 so that the valve 108 turns the flow of water off. Such an apparatus 100 may turn the water flow on more frequently or for longer durations when evaporation through the outlet 102 is faster, on dry warm, and/or windy days, and may turn the water flow on less frequently or for shorter durations in cooler, wetter, or less windy weather, without a user manually adjusting the flow of water to compensate for changing circumstances.

Additionally, in some embodiments, using an apparatus 100 that controls fluid flow to a location 116 based on a liquid level 112 in a container 106 may provide flow control without using electricity, and may be usable in circumstances where electrically controlled valves are not usable. For example, in some embodiments, the valve 108 is mechanically actuated based on the liquid level 112 (e.g., mechanically coupled to the liquid level 112 via a float 110, a pressure sensing diaphragm, or the like), so that the apparatus 100 does not use electricity. Such an apparatus 100 may be usable where electric power is not available. For example, an apparatus 100 may be used to control water delivery to sprinklers when landscaping for a building has been put in before an electrical permit has been issued. In some other embodiments, however, apparatuses 100 that controls fluid flow to a location 116 based on a liquid level 112 in a container 106 may use electricity, and may include electrically operated valves 108, liquid level sensors, or the like.

The container 106, in various embodiments, is shaped to receive a liquid. A level 112 for the liquid in the container 106 is depicted in FIGS. 1-6. A container 106 may be a vessel, a receptacle, an enclosure, or the like. A container 106 shaped to receive liquid may partially or fully enclose an interior volume, so that liquid remains in the interior volume for a period of time (e.g., until it exits the container 106 via the outlet 102). For example, a container 106 may include a bottom, which may be flat, convex, concave, or a more complex shape, so that liquid received in the container 106 does not fall downward out of the container 106, and may include walls which extend up from the bottom of the container 106, so that liquid received in the container 106 does not run out the sides of the container 106. A container 106 shaped to receive liquid may or may not include a top.

A container 106 may include one or more openings where liquid may enter or exit the container 106, and may still be referred to as being shaped to receive liquid.

Containers 106, in various embodiments, may be made of various materials, such as metal, polymers (e.g., thermoplastic or thermoset polymers), ceramic, glass or the like. In some embodiments, a container 106 may be formed of a material selected to receive and contain the liquid. For example, if the container 106 is to be used to receive water, the container 106 may be made of a material that is impervious, or substantially impervious to water, such as a polymer. In some embodiments, a container 106 may include a material that allows a liquid to exit the container 106. For example, one portion of a container 106 may include a membrane permeable to water (e.g., as an outlet 102, as described below), and may still be referred to as being shaped to receive water. In various embodiments, a container 106 may be a can, a jar, a bottle, a pipe with an end cap, or the like. Various other or further types of containers 106 shaped to receive liquid may be included in an apparatus 100.

In FIGS. 1-6, the container 106 is depicted in cross section, for convenience in showing components of the apparatus 100 that are disposed within the container 106, and the full shape of the container 106 is not shown. Although the walls of the container 106 are depicted only in cross section, they may be curved walls of a cylindrical container 106, flat walls of a rectilinear or box-shaped container 106, sloping walls of a tapered container 106, or the like.

When the apparatus 100 is used, the container 106 may receive or contain a liquid. The liquid, in some embodiments, is water. For example, where the apparatus 100 is used to control a fluid flow based on outdoor conditions, the liquid may be water from precipitation, groundwater, water from an irrigation system, or the like. In some other embodiments, the liquid is a liquid other than water, or is a mixture or solution including water and one or more other substances. For example, if the apparatus 100 is used to control a fluid flow based on conditions in a chemical plant, the liquid may be a chemical affected by the relevant conditions.

In some embodiments, the liquid may enter the container 106 via an outlet 102, which is described in further detail below with reference to liquid exiting the container 106. In some other embodiments, the liquid may enter the container 106 other than by the outlet 102. For example, liquid may enter the container 106 via a return line described below with reference to FIG. 2.

In various embodiments, the container 106 includes an outlet 102 configured to allow the liquid to exit the container 106. Liquid may be referred to as "exiting" the container 106 if any portion of the liquid is no longer in the container 106. For example, liquid entering the container 106 may raise the liquid level 112, and liquid exiting the container 106 may lower the liquid level 112. In some embodiments, liquid may simultaneously enter and exit the container 106 (e.g., precipitation and evaporation may occur simultaneously) so that the liquid level 112 rises or falls depending on whether the rate of liquid entering the container 106 is greater or less than the rate at which liquid exits the container 106. In certain embodiments, the liquid level 112 falling (or rising less quickly) may be referred to as liquid "exiting" the container 106, regardless of whether the substance that is in liquid form in the container 106 leaves the container 106 in liquid form or otherwise. For example, water leaving the container 106 by being drained from the container 106 in liquid form or by evaporating out of the container 106 in gaseous form may both be referred to as a liquid exiting the container 106.

An outlet 102 may be referred to as "configured" to allow a liquid to exit the container 106, if the shape, position, or any other attribute of the outlet 102 permit the liquid to exit the container 106. For example, in the depicted embodiment, the outlet 102 is an opening in the top of the container 106, allowing liquid to exit the container 106 by evaporation. In another embodiment, an outlet 102 may be positioned in the side of the container 106, in the bottom of the container 106, or the like, and may allow liquid to exit by draining from the container 106. In some embodiments a size and/or shape of the outlet 102 may affect a rate at which liquid exits from the container 106. For example, the size of an evaporation outlet 102 may affect an evaporation rate. Similarly, if the outlet 102 is an opening that allows liquid to exit by draining from the container 106, a smaller outlet 102 may result in liquid exiting in slow drips, while a larger outlet 102 may result in liquid exiting faster.

In some embodiments, an outlet 102 may be an opening, and may allow anything that fits through the opening to enter or exit the container 106 In certain embodiments, an outlet 102 may include a covering to provide a selective effect, such as a mesh, membrane, or other permeable material that prevents dirt or debris from entering the container 106 while still permitting liquid to exit (or enter) the container 106, a top covering with open sides (e.g., similar to a chimney cap) to permit evaporation but exclude precipitation, or the like. In some embodiments, an outlet 102 may include a plurality of openings such as a top evaporation opening and a lower drain opening, but may still be referred to as an "outlet" regardless of the number of openings. Various other or further sizes, shapes, configurations, and types of outlets 102 for allowing liquid to exit a container 106 may be included in an apparatus 100.

The valve 108, in the depicted embodiment, is configured to control a fluid flow based on the liquid level 112 in the container 106. A valve 108, in various embodiments, may be any device that controls or regulates a fluid flow. In the depicted embodiment, the valve 108 controls a fluid flow through the valve 108, from an inlet 104 through the output line 114. The inlet 104, in the depicted embodiment, is configured to connect to a water hose so that the valve 108 controls a flow of water. In another embodiment, an inlet 104 may be a fitting or connection that couples the apparatus 100 to a fluid source such as a storage tank, a pipe, or the like. Controlling a fluid flow may include permitting or turning on a fluid flow (e.g., when the valve 108 opens), and/or blocking or turning off a fluid flow (e.g., when the valve 108 closes). In some embodiments, controlling a fluid flow may include permitting a limited or restricted fluid flow. For example, some valves 108 may have one or more "partially on" positions or states between the on position and the off position that permit less fluid to flow than when the valves 108 are fully open. I Various types of valves 108 may control a fluid flow in various ways. For example, a valve 108 may include movable component such as a plunger, a diaphragm, a ball, or the like and may turn a fluid flow on or off based on the position of the movable component. Various other or further types of valves 108 for controlling a fluid flow may be included in an apparatus 100.

In various embodiments, a valve 108 configured to control a fluid flow based on a liquid level 112 may be any valve 108 that is coupled to the liquid level 112 so that the state of the valve 108 (e.g., on, off, partially on, or the like) depends on the liquid level 112. In some embodiments, a valve 108 configured to control a fluid flow based on a liquid level 112 may include or may be coupled to one or more parts configured to move, change state, or the like, based on the liquid level 112, to actuate the valve 108 (e.g., turn the fluid flow on or off) based on the liquid level 112. For example, in the depicted embodiment, the valve 108 includes a float 110 that floats in the container 106 at the liquid level 112, so that the valve 108 turns on when the float 110 falls (e.g., below a threshold liquid level 112 for turning the valve 108 on), and turns off when the float 110 rises (e.g., above a threshold liquid level 112 for turning the valve 108 off). In another embodiment, a valve 108 configured to control a fluid flow based on a liquid level 112 may include a diaphragm or pressure sensor to be submerged in the liquid so that the pressure on the diaphragm or pressure sensor corresponds to the liquid level 112 (e.g., at or near the bottom of the container 106). Such a valve 108 may turn on or off based on the pressure.

In some embodiments, a valve 108 configured to control a fluid flow based on a liquid level 112 may be a commercially available tank-filling valve. For example, tank-filling valves may be used for livestock watering, evaporative cooling, filling toilet cisterns, or the like. Such valves 108 may also be suitable for use in an apparatus 100.

In the depicted embodiment, the valve 108 is disposed in the container 106. Disposing a valve 108 in the container 106 may, in certain embodiment, provide a compact apparatus 100. In another embodiment, a valve 108 may be disposed at least partially outside the container 106, but may include or be coupled to an actuator such as a float 110 or diaphragm inside the container 106.

A fluid flow controlled by the valve 108, in various embodiments, may be the flow, movement, or current, of a fluid through the valve 108 (e.g., from the inlet 104 though the output line 114). The fluid for which the valve 108 controls a flow, in some embodiments, may be the same as the liquid in the container 106. For example, for irrigation, the liquid in the container 106 may be water, and the fluid flow controlled by the valve 108 may be a flow of water. In some other embodiments, the fluid for which the valve 108 controls a flow may be different from the liquid in the container 106. For example, a valve 108 may control treated water that includes a fertilizer or herbicide for irrigation, chlorine for pool filling, or the like, while the liquid in the container 106 may be untreated or diluted. In certain embodiments, the valve 108 or the fluid flow controlled by the valve 108 may be coupled to a container or tank for storing an additive, a device that adds an additive into the fluid flow, or the like.

The output line 114, in the depicted embodiment, is coupled to the valve 108, and configured to convey the fluid flow from the valve 108 to a location 116 outside the container 106. An output line 114, in various embodiments, may be any tube, hose, pipe, channel, or the like, capable of conveying a fluid. For example, in one embodiment, an output line 114 may be flexible irrigation tubing. In another embodiment, an output line 114 may be a rigid pipe. An output line 114 coupled to the valve 108 may receive fluid from the valve 108 (e.g., when the valve 108 is open), and may convey the fluid to the location 116. In one embodiment, an output line 114 may be detachably coupled to the valve 108. For example, a tube or hose as an output line 114 may be coupled to or detached from the valve 108 via a fitting or connector. In another embodiment, an output line 114 may be non-detachably coupled to the valve 108, integrally formed as part of the valve 108, or the like.

In one embodiment, an output line 114 may be referred to as "configured" to convey a fluid flow from the valve 108 to a location 116 outside a container 106 if the output line 114 is actually disposed with one end at the valve 108 and another end at the location 116. In another embodiment, an output line 114 may not yet be disposed between the valve 108 and the location 116 (e.g., when the apparatus 100 is being stored, transported, set up, or is otherwise not in use), but may nevertheless be referred to as "configured" to convey a fluid flow from the valve 108 to a location 116 outside a container 106 if the output line 114 is long enough to reach a location 116 outside the container 106 when the apparatus 100 is in use, is shaped to reach a location 116 outside the container 106 when the apparatus 100 is in use, or the like.

A location 116 outside the container 106, in various embodiments, may be any place, region, or area that is not within the container 106. For example, where an apparatus 100 is used for irrigation, a location 116 outside the container 106 may be a location where one or more plants are to be watered. Similarly, where an apparatus 100 is used for filling a tank or pool, the location 116 may be the tank or pool.

Additionally, in various embodiments, the location 116 outside the container 106 does not receive the liquid that exits the container 106 directly from the outlet 102. A location 116 that does not receive liquid directly from the outlet 102 of a container 106 may, in some embodiments, be disposed some distance away from the container 106 and/or the outlet 102 so that liquid leaving the container 106 (or, at least most of the liquid leaving the container 106) via the outlet 102 does not arrive at the location 116. For example, a location 116 that does not receive liquid directly from the outlet 102 of a container 106 may be a location that is not substantially in fluid communication with the outlet 102. However, in certain embodiments, a location 116 that does not receive liquid directly from the outlet 102 may still receive some amount of liquid indirectly from the outlet 102. For example, some small fraction of a liquid that exits an outlet 102 via evaporation may eventually condense at the location 116. Similarly, if an outlet 102 allows liquid from the container 106 to drain into the ground, the location 116 may be ground (e.g., a garden plot, a bed, or the like) disposed away from the outlet 102, and some small fraction of the liquid discharged from the outlet 102 may eventually reach the location 116 as groundwater. However, such a location 116 may still be referred to as not receiving liquid directly from the outlet 102 because the outlet 102 is not configured to discharge liquid directly at the location 116.

In certain embodiments, controlling a fluid flow to a location 116 outside a container 106 based on a liquid level 112 inside the container 106 may allow an apparatus 100 to be compact. For example, in some embodiments the liquid in the container 106 may be for control only (so that liquid leaving via the outlet 102 affects the liquid level 112 and the valve 108), and not for use at the location 116. In further embodiments, with liquid in the container 106 used for control only, an apparatus 100 may include a small container 106 where the amount of liquid in the container 106 is much less than (e.g., less than 50% of, less than 20% of, less than 10% of, less than 5% of, or even less than 1% of) an amount of fluid delivered to the location 116 when the valve 108 turns on.

By contrast, where float valves are used for tank filling in other contexts, the tank may be where the water is ultimately used (e.g., livestock may drink from the tank), or may be a reservoir with an outlet carrying water to where it is ultimately used (e.g., an evaporative cooler may pump water from the tank to evaporative pads above the tank). In either case, the tank may be large to hold the amount of water that is actually to be used, and may require a float valve to be permanently or durably installed. Conversely, in various embodiments, an apparatus 100 that uses a liquid level 112 in a container 106 for control of a valve 108 only may be small and portable, because it does not need to hold a large amount of the fluid that the valve 108 and the output line 114 deliver to a location 116 outside the container 106.

Figure 2:
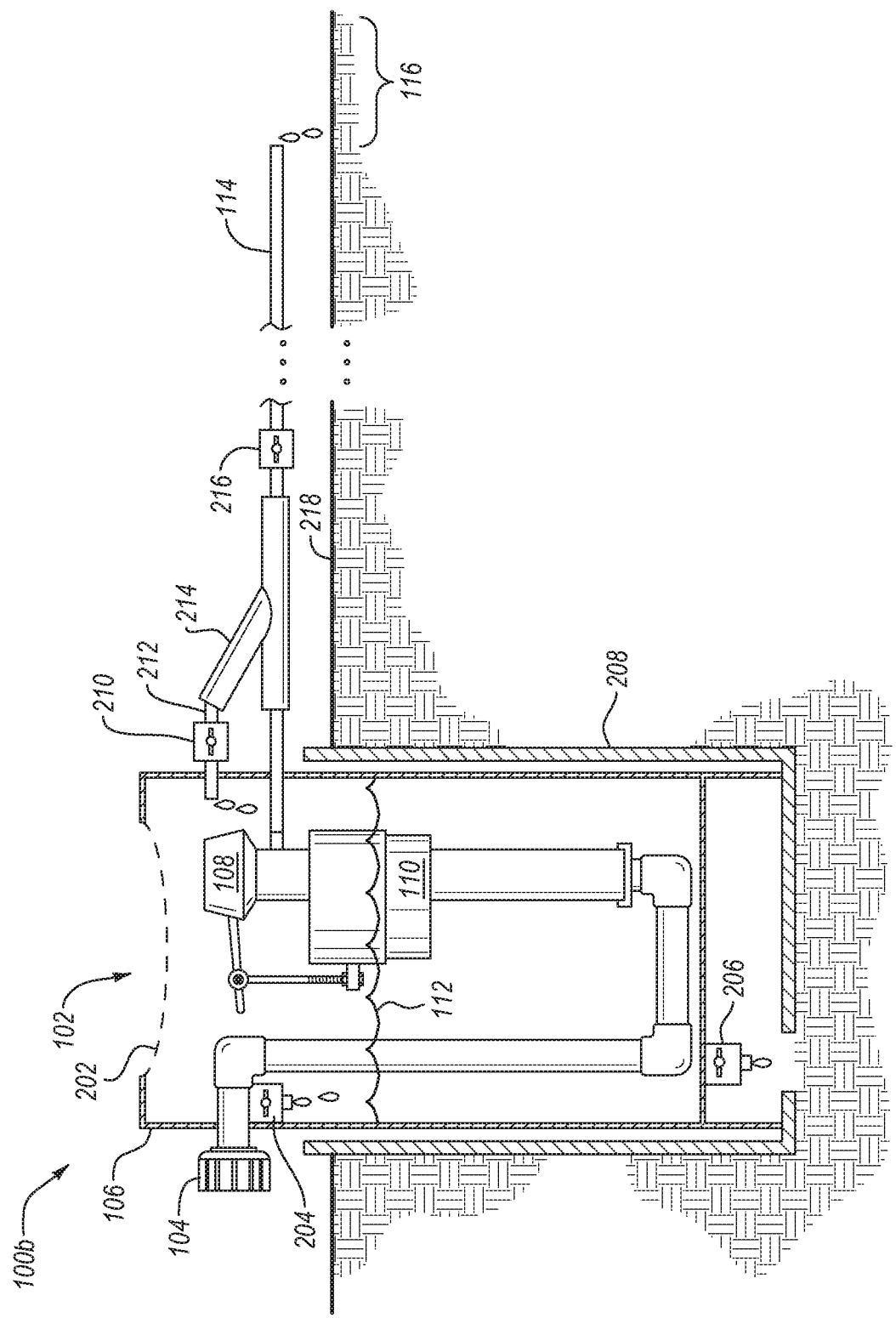
FIG. 2 is a side view illustrating another embodiment of an apparatus for fluid flow control.

FIG. 2 depicts another embodiment of an apparatus 100b for fluid flow control. In the depicted embodiment, the apparatus 100b is substantially similar to the apparatus 100a described above with reference to FIG. 1, including a container 106, a valve 108 and an output line 114, substantially as described above. In the depicted embodiment, the apparatus 100b includes a mesh 202, a fill valve 204, a drain valve 206, a sleeve 208, a return line 212, a branch connector 214, a return flow control device 210, and an output flow control device 216, which are described below.

The sleeve 208, in the depicted embodiment, is shaped to receive the container 106, and is configured to be disposed in the ground 218. A sleeve 208 shaped to receive the container 106, in various embodiments, may be a similar shape to the container 106, and may be have one or more inner dimensions that are at least as large as corresponding outer dimensions of the container 106, to admit the container 106. For example, if the container 106 is cylindrical, the sleeve 208 may be cylindrical with an inner diameter at least as large as an outer diameter of the container 106. Similarly, if the container 106 is rectilinear or box-shaped, the sleeve 208 may have an inner length and width at least as large as the outer length and width of the container 106.

Ground 218, in various embodiments, may be an area of land, dirt, soil, or the like, and may include an area of land where dirt is naturally present on the surface of the earth, such as in a field or garden, or may include a human-created area or region of dirt in a raised bed, a plant pot, or the like. The location 116 that receives fluid from the output line 114, in certain embodiments, may also be a region of ground 218, separate from where the container 106 is disposed. In some embodiments, the apparatus 100b is configured to be disposed in the ground 218 (e.g., either directly or in a sleeve 208). An apparatus 100, container 106, or sleeve 208 configured to be disposed in the ground 218, in various embodiments, may have a shape, a material, and/or other attributes that exclude dirt or other substances from the inside of the apparatus 100, container 106, or sleeve 208. For example, in certain embodiments, a sleeve 208 configured to be disposed in the ground 218 may include rigid walls made of metal, plastic, or the like. With a sleeve 208 disposed in the ground 218, a user may place the container 106 in the sleeve 208 or remove the container 106 from the sleeve 208.

In some embodiments, a user may bury the sleeve 208 in the ground 218, with an upper opening of the sleeve 208 uncovered. The user may dispose the container 106 in the sleeve 208 when the apparatus 100b is in use. In certain embodiments, disposing the apparatus 100b in the ground 218 (e.g., in a sleeve 208) may leave the outlet 102 of the container 106 exposed to permit evaporation, but may protect the buried portion of the container 106 from damage (e.g., from lawn mowers, people stepping on the container 106, or the like). In another embodiment, the container 106 may be disposed directly in the ground 218, without a sleeve 208. However, the sleeve 208, in certain embodiments, may facilitate repeated insertion and removal of the container 106 from the same location in the ground 218. For example, a user may remove the container 106 from the sleeve 208 to maintain or adjust the apparatus 100b, then may replace the apparatus 100b in the sleeve 208.

In the depicted embodiment, the outlet 102 includes an opening configured to allow the liquid to exit the container 106 via evaporation. In certain embodiments, an outlet 102 at or near the top of the container 106 may permit evaporation and may also allow falling water from precipitation or from sprinklers to enter the container 106. However, with the apparatus 100b disposed in the ground 218, an evaporation outlet 102 may also allow dirt or debris to fall into the container 106. Accordingly, in the depicted embodiment, the outlet 102 includes a mesh 202 covering the outlet 102.

A mesh 202, in various embodiments, may be a material with small holes so that liquid can enter and/or exit the container 106 via the holes (e.g., via precipitation or evaporation), but so that solids larger than the holes are excluded from the container 106. For example, in various embodiments a mesh 202 may be a wire grid, a plastic webbing or netting, a fabric, a material made or sold for window screens, or the like. In some embodiments, holes may be sized to exclude solids such as dirt, debris, insects, or the like from the container 106.

The return line 212, in the depicted embodiment, is coupled to the output line 114, and is configured to divert a portion of the fluid flow controlled by the valve 108 from the output line 114 into the container 106. In various embodiments, a return line 212, like the output line 114, may be any tube, hose, pipe, channel, or the like, capable of conveying a fluid, such as flexible irrigation tubing, a rigid pipe, or the like. The return line 212 may be detachably or non-detachably coupled to the output line 114. In certain embodiments, the return line 212 may be coupled to the output line 114 outside the container 106. In further embodiments, a return line 212 configured to divert a portion of the fluid flow from the output line 114 may be coupled in fluid communication with the output line 114, so that a portion of the fluid flow from the valve 108 is diverted into the return line 212. The remainder of the fluid flow in the output line 114 may still be delivered to the location 116, as described above.

In certain embodiments, using a return line 212 to divert a portion of the fluid flow from the output line 114 into the container 106 may affect a run time for the apparatus 100b. A run time, in various embodiments, may be a time during which the valve 108 is open, delivering fluid to the location 116. For example, a run time may start when the liquid level 112 falls to a point that the valve 108 turns on, and may end when the liquid level 112 rises to a point that the valve 108 turns off.

In certain embodiments, where the apparatus 100 is used for irrigation, evaporation of liquid from the container 106 may lower the liquid level 112, turning the valve 108 on, causing the output line 114 to deliver water to one or more sprinklers at the location 116 outside the container 106. In some embodiments, water entering the container 106 may raise the liquid level 112, turning the valve 108 (and the sprinklers) off. Thus, the amount of water delivered to the location 116 may depend on how fast water enters the container 106 to raise the liquid level 112. Similarly, when the apparatus 100 is used other than for irrigation, the rate at which fluid/liquid enters the container 106 may determine how long the valve 108 remains on. Thus, in various embodiments, using a return line 212 to divert a portion of the fluid flow from the output line 114 into the container 106 may affect or determine the run time. The flow rate for fluid entering the container 106 from the return line 212 may determine the rate at which the liquid level 112 rises, thus determining how soon the valve 108 turns off.

In contrast, devices that rely on a liquid level falling to turn a fluid flow on, but that do not include a return line 212 to raise the liquid level and turn the fluid flow off, may rely on more complex ways of turning a valve off. For example, a system may include electronic valve timers to turn a valve off. Conversely, an apparatus 100 including a return line 212 may turn a valve 108 on and off based on the liquid level 112, without relying on more complex electronics. In another embodiment, however, an apparatus 100 may be configured to raise the liquid level 112 when the valve 108 is on, without using a return line 212. For example, the apparatus 100 may be disposed downhill from the location 116, or may include an opening allowing groundwater to enter, so that some irrigation water delivered to the location 116 runs back into the container 106.

In the depicted embodiment, a branch connector 214 couples the return line 212 to the output line 114. In certain embodiments, a branch connector 214 may be disposed along the output line 114, between the valve 108 and the location 116 outside the container 106. A branch connector 214, in various embodiments, may be any connector or fitting that permits water from an inlet to flow to at least two different outlets or branches. The output line 114 may be coupled to the inlet of the branch connector 214 and to a first outlet, to convey fluid to the location 116, and the return line 212 may be coupled to a second outlet of the branch connector 214, so that a portion of the fluid flow arriving at the inlet of the branch connector 214 is diverted to the return line 212 to convey fluid to the container 106. In various embodiments, a branch connector 214 may be a "Y" connector, a "T" connector, or the like.

In the depicted embodiment, the apparatus 100b includes a return flow control device 210 and an output flow control device 216. Although both a return flow control device 210 and an output flow control device 216 are present in the depicted embodiment, another embodiment of an apparatus 100 may include a return flow control device 210 without an output flow control device 216, or an output flow control device 216 without a return flow control device 210. In another embodiment, an apparatus 100 may omit both the return flow control device 210 and an output flow control device 216.

A flow control device 210, 216, in various embodiments, such as a return flow control device 210 and/or an output flow control device 216, may be any device that controls a flow rate. In one embodiment, a flow control device 210, 216 may be a valve that is adjustable by a user to increase or decrease a flow rate, such as a ball valve, a butterfly valve, a plug valve, or the like. In another embodiment, a flow control device 210, 216 may be a non-adjustable device that controls or limits a flow rate. For example, the branch connector 214 may include a narrower bore in one outlet than in another outlet to limit the fluid flow in that outlet relative to the other outlet.

The return flow control device 210, in the depicted embodiment, is disposed in fluid communication with the return line 212 to control a fill rate for the container 106. As described above, the fill rate for the container 106 may determine the run time for delivering fluid to the location 116. Thus, using a return flow control device 210 to limit or decrease the fill rate may increase the run time. Conversely, omitting a return flow control device 210 or adjusting a return flow control device 210 to increase the fill rate may decrease the run time.

The output flow control device 216, in the depicted embodiment, is disposed in fluid communication with the output line 114 to control an output rate for delivering fluid to the location 116. An output rate, in various embodiments, may be the rate at which fluid is delivered to the location 116. In the depicted embodiment, the output flow control device 216 is downstream of the branch connector 214, and controls the output rate directly. In another embodiment, the output flow control device 216 may be upstream from the branch connector 214 and/or the return flow control device 210, and may control the total flow through the branch connector 214, thus indirectly controlling the output rate, with the return flow control device 210 further controlling the fill rate for the container 106.

In some embodiments, an apparatus 100 may include a manual override. A manual override, in various embodiments, may be any device that allows a user to manually turn the valve 108 on by lowering the liquid level 112, and/or to manually turn the valve 108 off by raising the liquid level 112. In some embodiments, a manual override may include a drain valve 206 and/or a fill valve 204. In the depicted embodiment, a manual override includes both a drain valve 206 and a fill valve 204.

The fill valve 204, in one embodiment, is operable by a user to fill the container 106. For example, in the depicted embodiment, the fill valve 204 is coupled to the inlet 104 upstream from the valve 108. In another embodiment, a fill valve 204 may be coupled to a source of water (or of another liquid) separate from the inlet 104. A user may fill the container 106 using the fill valve 204 to shorten the run-time of the apparatus 100, or to prevent the valve 108 from turning on. For example, if the apparatus 100 for irrigation, the user may fill the container 106 using the fill valve 204 on a day when rain is predicted, to prevent the valve 108 from turning on, or to turn the valve 108 off if it is already on.

The drain valve 206, in one embodiment, is operable by a user to drain the container 106. For example, the container 106 may include a drain opening at the bottom of the container 106, and a drain valve 206 may be closed to prevent liquid from exiting the container 106 via the drain opening, or may be opened to drain the container 106. In further embodiments, a user may open the drain valve 206 to drain the container 106, thus turning the valve 108 on, and may then close the drain valve 206, allowing the container 106 to re-fill (e.g., via the return line 212) so that the valve 108 turn off after some period of time. In one embodiment, a user may access the drain valve 206 by temporarily removing the container 106 from the sleeve 208. In another embodiment, the apparatus 100 may include a linkage connecting an above-ground control to the drain valve 206, so that a user can operate the drain valve 206 without removing the container 106 from the sleeve 208.

Additionally, in certain embodiments, an outlet 102 configured to allow liquid to exit the container 106 may include a drain, such as the drain valve 206. In various embodiments, a drain may be an opening permitting liquid to drain out of the container 106, and may be a permanent opening such as a drain hole or an adjustable opening such as a drain valve 206. In the depicted embodiment, the outlet 102 includes both a top evaporation opening and a drain valve 206 allowing water to exit the container 106. In another embodiment, an outlet 102 may include a drain or drain valve 206 without an evaporation opening. For example, the container 106 may have a closed top. In another embodiment, an outlet 102 may include an evaporation opening without a drain or drain valve 206.

In certain embodiments, a drain rate for liquid exiting the container 106 via a drain may control how often the valve 108 turns on, or may increase a run time by effectively decreasing a fill rate. For example, in some embodiments, a user may adjust the drain valve 206 to drain liquid from the container 106 at a slow drip. Evaporation may cause liquid to exit the container 106 more quickly on hot or dry days, or less quickly on cool or wet days, thus turning the valve 108 on more or less often, but liquid slowly dripping out of the container 106 via the drain valve 206 may cause the valve 108 to turn on at some minimum frequency. In one embodiment, a minimum frequency for turning the valve 108 on, corresponding to a drain rate, may be adjusted by adjusting a drain valve 206. In another embodiment, a minimum frequency for turning the valve 108 on, corresponding to a drain rate, may be preset in an apparatus 100 with a fixed-size or non-adjustable drain opening.

Figure 3:
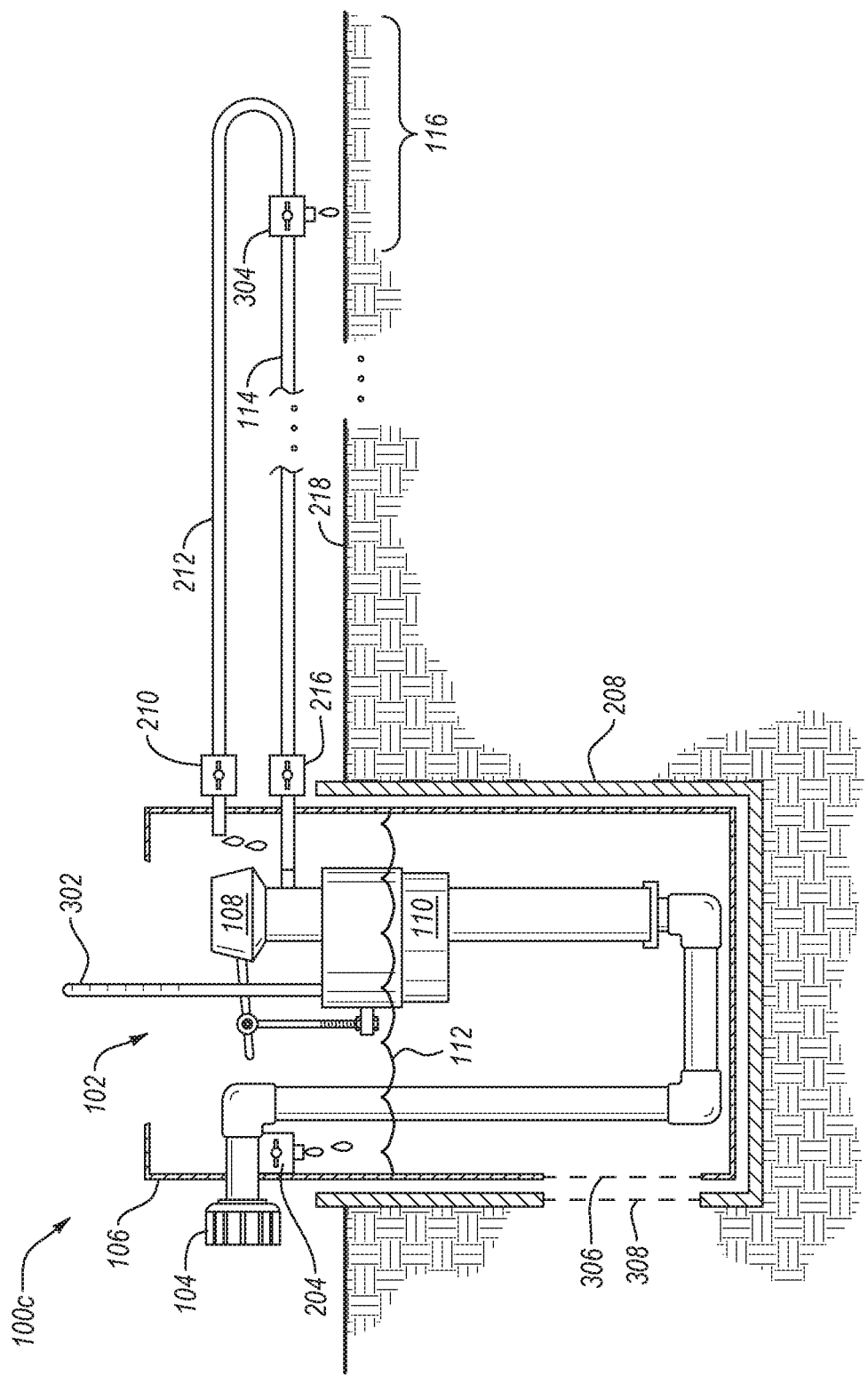
FIG. 3 is a side view illustrating another embodiment of an apparatus for fluid flow control.

FIG. 3 depicts another embodiment of an apparatus 100c for fluid flow control. In the depicted embodiment, the apparatus 100c is substantially similar to the apparatuses 100a-b described above with reference to FIGS. 1-2, including a container 106, a valve 108, an output line 114, a fill valve 204, a sleeve 208, a return line 212, a return flow control device 210, and an output flow control device 216, substantially as described above. In the depicted embodiment, the apparatus 100c includes a liquid level indicator 302, one or more sprinklers 304, and one or more permeable materials 306, 308.

A liquid level indicator 302, in various embodiments, may indicate the liquid level 112 in the container 106. In certain embodiments, it may be difficult for a user to directly perceive the liquid level 112 in the container 106. For example, if the container 106 is partially buried in the ground 218, covered by a mesh 202, or the like, it may be difficult for a user to see the liquid level 112. Thus, in certain embodiments, a liquid level indicator 302 may be any device that indicates or shows the liquid level 112 to a user, either directly or indirectly. For example, in one embodiment, if the container 106 is not buried, a liquid level indicator 302 may be a transparent window in the side of the container 106, permitting observation of the liquid level 112 through the window. In the depicted embodiment, the liquid level indicator 302 is a rod coupled to the float 110 for the valve 108, so that the extent to which the rod extends out of the container 106 indicates the liquid level 112 in the container 106. In another embodiment, a liquid level indicator 302 may be coupled to a float separate from the valve 108. In some embodiments, a liquid level indicator 302 may be another component that moves based on the liquid level 112, such as a rotating needle that rotates between empty and full positions based on a position of a float 110. Various other or further types of liquid level indicators 302 may be included in an apparatus 100.

In the depicted embodiment, the apparatus 100c includes one or more sprinklers 304. A sprinkler 304, in various embodiments, may include any irrigation device that sprinkles or drips water on plants. For example, in the depicted embodiment, a sprinkler 304 is a drip irrigation head. In another embodiment, a sprinkler 304 may be an impact sprinkler, a rotating sprinkler, a stationary spray sprinkler, head, a linear device such as a perforated sprinkler hose or soaker hose, or the like. Sprinklers 304 may be portable devices in some embodiments, or may be permanently installed devices in some other embodiments. Various other or further types of sprinkler 304 may be included in an apparatus 100.

In the depicted embodiment, the return line 212 is coupled to the output line 114 after the location 116 outside the container 106 (e.g., the location 116 to which fluid from the valve 108 is delivered). Accordingly, fluid not used at the location 116 is returned to the container 106 by the return line 212. In certain embodiments, using a branch connector 214 to divert fluid into the return line 212 before the location 116 may provide a short return line 212, if the branch connector 214 is disposed close to the container 106. In the depicted embodiment, using a return line 212 to divert fluid that is not used at the location 116 back to the container 106 may involve a longer return line 212, but may avoid pressure drops at the location 116 that might occur if fluid is diverted into the return line 212 before the location 116.

Additionally, although one sprinkler 304 is depicted in FIG. 3, multiple sprinklers 304 may be coupled to the output line 114, resulting in decreased pressure at the later sprinklers 304. Similarly, if the apparatus 100 is used to deliver fluid to a location 116 without using sprinklers, an output line 114 may include a single outlet delivering liquid to the location 116, or multiple outlets delivering fluid to the location 116. If a user adds more sprinklers 304 or outlets to the apparatus 100c of FIG. 3, with the return line 212 looping back to the container 106 after the location 116, the pressure will decrease at the last sprinkler 304 or outlet, and in the return line 212, thus decreasing the fill rate for the container 106, and thereby increasing the run time for the apparatus 100c. Thus, an apparatus 100c with a return line 212 coupled to the output line 114 after the location 116 may provide a short run time if fluid consumption at the location 116 is low (e.g., if there are few sprinklers 304, or if a flow rate at the location 116 is otherwise configured to be small), and may provide a longer run time if fluid consumption at the location 116 is high (e.g., if there are more sprinklers 304, or if a flow rate at the location 116 is otherwise configured to be large).

Additionally, in certain embodiments, the apparatus 100c is configured to be disposed in the ground 218 (e.g., either directly or in a sleeve 208). In the depicted embodiment, a permeable material 306, 308 is configured to allow liquid to pass between the container 106 and the ground 218. Liquid passing between the container 106 and the ground 218 may include liquid exiting the container 106 into the ground 218, and/or liquid entering the container 106 from the ground 218. As described above, an outlet 102 may include a drain opening. In a further embodiment, a drain opening may include the permeable material 306, 308.

A permeable material 306, 308, in various embodiments, may be a substance that allows water or other liquids to pass through the permeable material 306, 308, and that blocks solids (or solids above a certain size) from passing through the permeable material 306, 308. In various embodiments, a permeable material 306, 308 may include a mesh, a membrane, a wicking material, or the like. A mesh, as described above, may include small holes allowing liquid to pass while excluding larger particles such as dirt, debris, insects, or the like. A membrane, similarly, may be a porous substance allowing liquid to pass while excluding larger particles from passing through pores in the substance. A wicking material may include a material through which liquid may move by capillary action.

In the depicted embodiment, the container 106 includes a permeable material 306 covering a drain opening, and the sleeve 208 includes a permeable material 308 covering a corresponding opening. Thus, liquid may exit the container 106 into the ground 218 through the permeable materials 306, 308. In certain embodiments that omit a sleeve 208, a permeable material 306 may allow water to exit the container 106 directly into the ground. Additionally, in certain embodiments, one or more permeable materials 306, 308 may permit groundwater to enter the container 106. Although the permeable material 306, 308 is depicted as a covering for the drain opening in FIG. 3, a permeable material 306, 308 in another embodiment may extend into the container 106 and/or into the ground 218. For example, a container 106 without a sleeve 208 may be buried in the ground, and a permeable material 306 may be a wicking material that extends into the container 106 and into the ground 218 to facilitate water exiting the container 106 into the ground 218. As further examples, a permeable material that extends into the container 106 and into the ground 218 may be threaded through a hole in a sleeve 208 when the container 108 is disposed in the sleeve 208, or may be formed in two parts as a permeable material 308 extending from the sleeve 208 into the ground 218, in fluid communication with a permeable material 306 extending from the drain opening into the container.

In certain embodiments, allowing liquid to exit the container 106 into the ground 218, or allowing groundwater to enter the container 106, may provide a run time that depends on ground moisture for the apparatus 100. For example, if the ground 218 is dry, liquid may exit the container 106 quickly, thus turning on the valve 108 more often and/or providing longer run times as the container 106 fills less quickly. If the ground 218 is less dry, liquid may exit the container 106 slowly, thus turning on the valve 108 less often and/or for shorter run times. If the ground 218 is saturated or very wet, groundwater entering the container 106 may prevent the valve 108 from turning on. Accordingly, if an apparatus 100c is used for irrigation, providing a permeable material 306, 308 so that liquid can exit or enter the container 106 to or from the ground 218 may provide more irrigation when the ground 218 is dry and less irrigation when the ground 218 is wet.

Furthermore, in some embodiments, an apparatus 100c with a permeable material 306, 308 that allows liquid to exit the container 106 into the ground 218 may be buried with the container 106 fully in the ground 218. Such an apparatus may have a closed top, may allow water to enter or exit the container 106 via an outlet 102 in the form of a drain opening with a permeable material 306, 308 (rather than by evaporation), and may omit a liquid level indicator 302, or may be buried with the container 106 under the ground and a liquid level indicator 302 extending above the ground. Burying a container 106 fully, rather than partially, in the ground may, in certain embodiments, protect the apparatus 100 from being damaged by surface-level items, direct sunlight, or the like.

Figure 4:
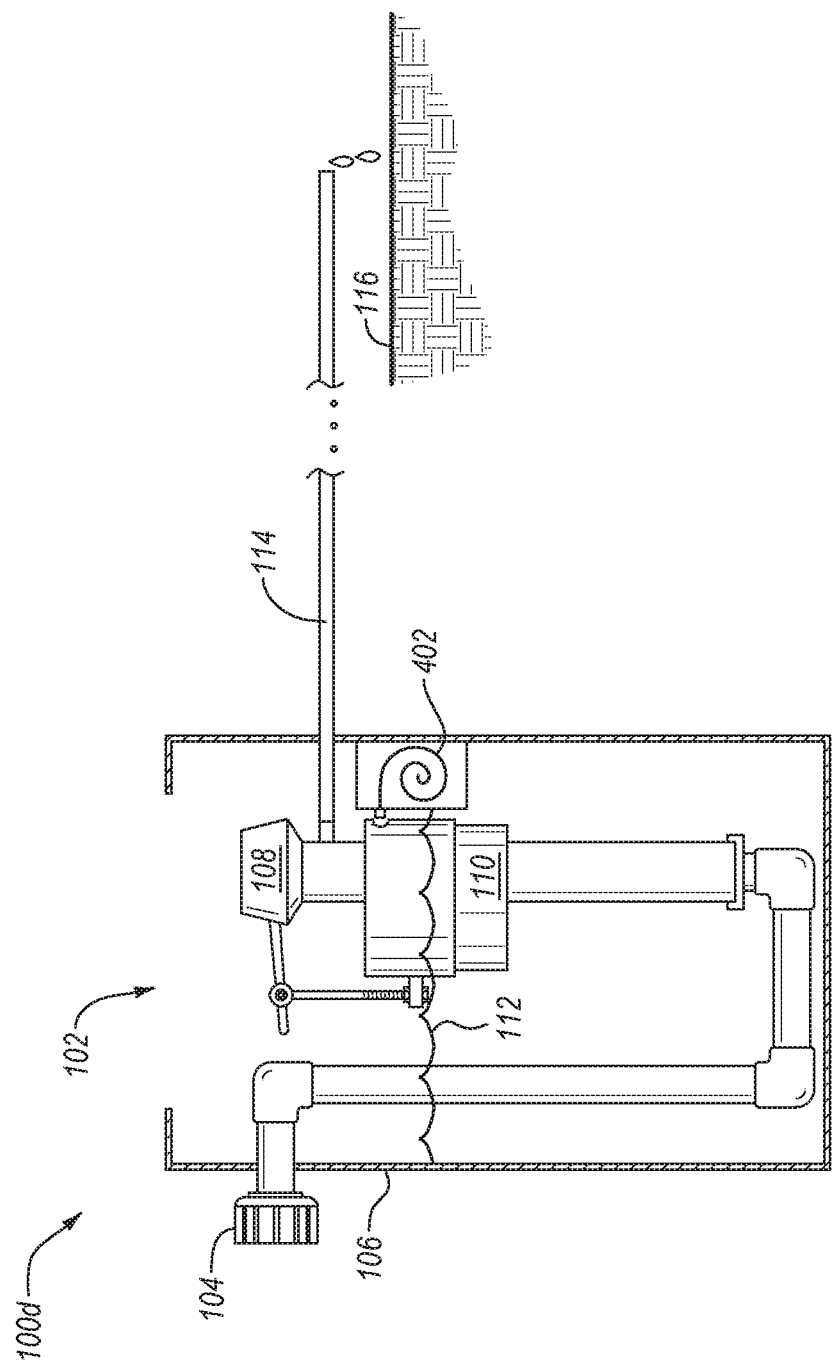
FIG. 4 is a side view illustrating another embodiment of an apparatus for fluid flow control.

FIG. 4 depicts another embodiment of an apparatus 100d for fluid flow control. In the depicted embodiment, the apparatus 100d is substantially similar to the apparatuses 100a-c described above with reference to FIGS. 1-3, including a container 106, a valve 108 and an output line 114, substantially as described above. In the depicted embodiment, the apparatus 100d includes a valve latch 402.

A valve latch 402, in various embodiments, may be any device configured to delay or temporarily prevent the valve 108 from opening. In certain embodiments, a liquid level 112 in the container 106 may drop to a point at which the valve 108 turns the fluid flow to the location 116 on, but at a time when fluid delivery may be undesirable or inefficient. For example, if an apparatus 100 is used for watering, the liquid level 112 may fall due to evaporation in the afternoon, but it may not be efficient to deliver water to the location 116 while high-evaporation conditions exist. In further embodiments, it may be more efficient to delay watering (or other fluid delivery) for some amount of time. For, example, it may be more efficient to delay watering until evening. Thus, in various embodiments, a valve latch 402 may delay the valve 108 from opening.

In one embodiment, a valve latch 402 may be manually operated by a user. For example, a user may move a valve latch 402 to a first position to prevent the valve 108 from opening, and may subsequently move the valve latch 402 to a second position to allow the valve 108 to open. In some embodiments, a valve latch 402 may be electrically or mechanically operated. For example, a valve latch 402 may include an electrical (e.g., line-powered or battery-operated) or mechanical timer that permits the valve 108 to open after a preset or user-defined time period. In certain embodiments, a valve latch 402 may be heat activated.

A heat activated valve latch 402, in various embodiments, may be any device that is activated by heat (e.g., in response to a temperature exceeding a threshold), to prevent the valve 108 from opening. In the depicted embodiment, the float 110 includes a notch, and the heat activated valve latch 402 includes a bimetallic strip that expands in response to heat to engage the notch, thus preventing the float 110 from falling, and the valve 108 from turning on when the heat activated valve latch 402 is activated, even if the liquid level 112 in the container 106 falls. In another embodiment, a heat activated valve latch 402 may include an electronic temperature sensor (e.g., a thermocouple) and an electrical actuator, a wax actuator that expands or contracts based on heat, or any other substance or components capable of responding to heat to expand, contract, or otherwise prevent a valve 108 from opening. Similarly, although the heat activated valve latch 402 in the depicted embodiment engages a notch in a float 110, a heat activated valve latch 402 in another embodiment may engage another portion of a valve 108 (e.g., if the valve 108 is pressure actuated rather than float actuated).

In certain embodiments, where an apparatus 100 is used for watering, for outdoor tank filling or for other purposes where water use may be more effective at low temperatures, water in the container 106 may evaporate when the temperature is high, causing the liquid level 112 to drop to a point at which the valve 108 would normally turn on. However, the heat activated valve latch 402 may also activate in response to the high temperature, preventing the valve 108 from turning on. When the temperature falls below the activation threshold, the heat activated valve latch 402 may de-activate or disengage, allowing the valve 108 to turn on. Thus, an apparatus 100 including a heat activated valve latch 402 may delay the fluid flow controlled by the valve 108 until a temperature has fallen below a threshold. For example, an apparatus 100d used for watering may provide water to sprinklers 304 during a cool evening, when the heat activated valve latch 402 has disengaged, in response to liquid evaporating from the container 106 during a hot afternoon. Delayed watering (or other fluid delivery) when a temperature is below a threshold may, in certain embodiments, be more efficient than immediate watering (or other fluid delivery) when a temperature is above a threshold.

Figure 5:
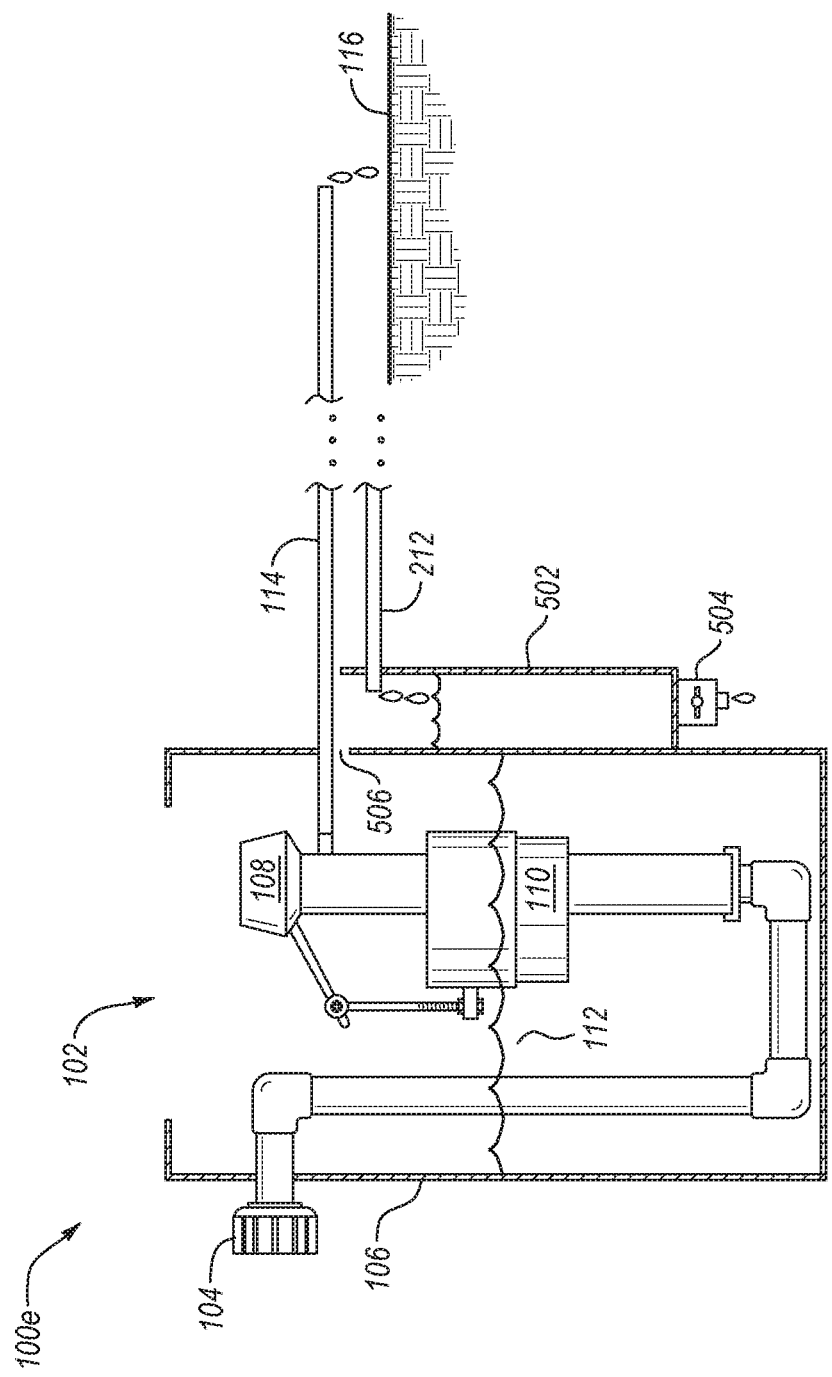
FIG. 5 is a side view illustrating another embodiment of an apparatus for fluid flow control.
Figure 6:
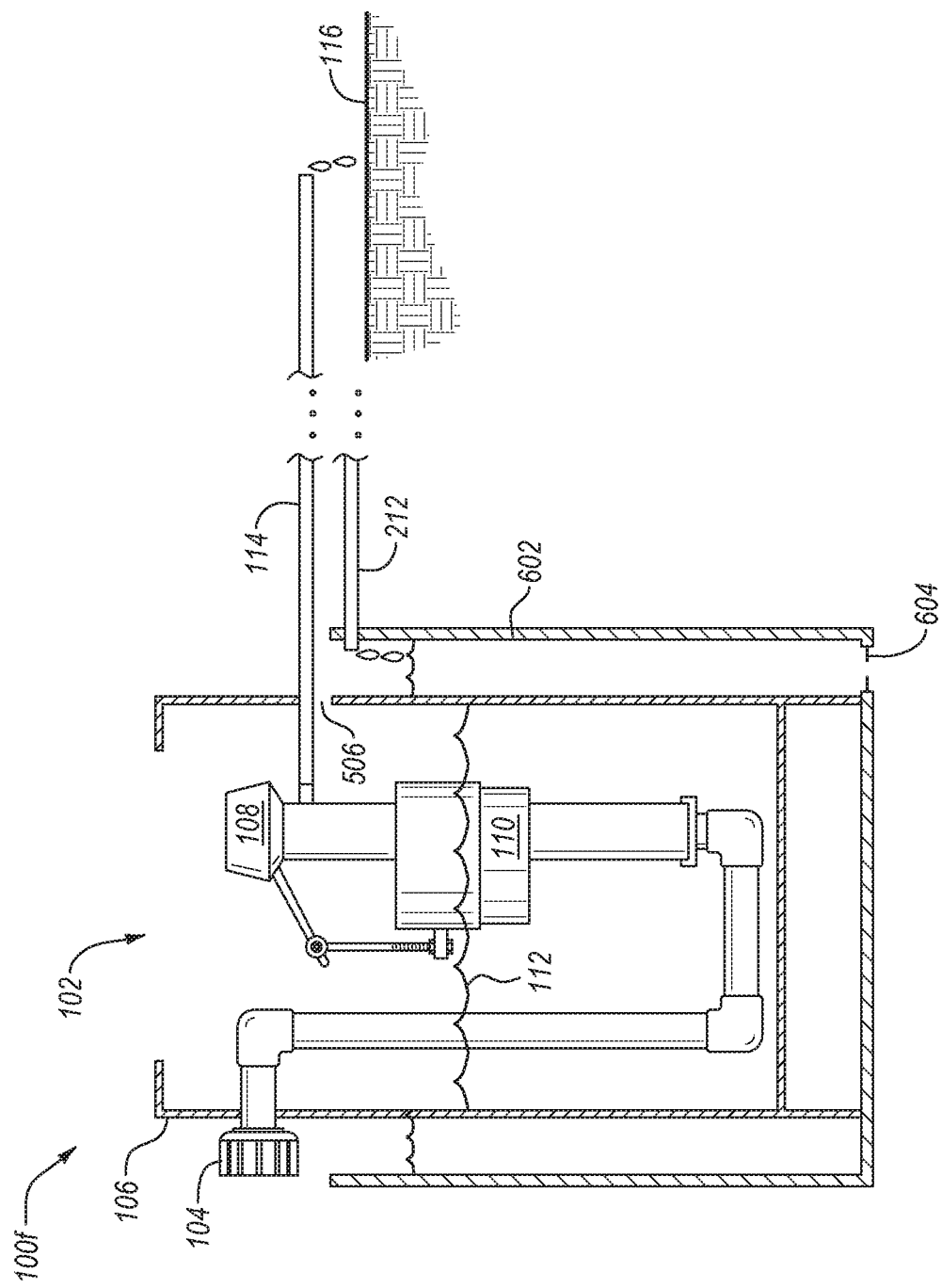
FIG. 6 is a side view illustrating another embodiment of an apparatus for fluid flow control.

FIGS. 5 and 6 depict further embodiments of an apparatus 100e, 100f (respectively), for fluid flow control. In the depicted embodiment, the apparatus 100 is substantially similar to the apparatuses 100a-d described above with reference to FIGS. 1-4, including a container 106, a valve 108, an output line 114, and a return line 212 substantially as described above. In the depicted embodiment, the container 106 includes a primary tank and a secondary tank 502, 602. The primary tank in FIGS. 5 and 6, is where the valve 108 is disposed, and the liquid level 112 is the level in the primary tank.

The secondary tank 502, 602, in the depicted embodiment, is in fluid communication with the primary tank. In certain embodiments, the secondary tank 502, 602 receives the portion of the fluid flow that is diverted from the output line 114, via the return line 212 (e.g., via a branch connector 214 as in FIG. 2 or a looped return line 212 as in FIG. 3). In the depicted embodiment, the primary tank and the secondary tank 502, 602 are open-topped. In another embodiment, the primary tank and/or the secondary tank 502/602 may be covered on top by a mesh (e.g., the mesh 202 of FIG. 2) to exclude dirt, debris, insects, or the like, or may be closed on top (e.g., if the outlet 106 allows water to leave the container 106 other than by evaporation).

In a further embodiment, the secondary tank 502, 602 includes a drain port 504, 604. The drain port 504, 604, may be an opening, valve, or the like, that allows liquid to drain from the secondary tank 502, 602. For example, in FIG. 5, the drain port 504 is a user-adjustable drain valve, similar to the drain valve 206 described above with reference to FIG. 2. In FIG. 6, the drain port 604 is a small opening configured to allow liquid to drip out of the secondary tank 602, which may include a permeable material similar to the permeable material 306 described above with reference to FIG. 3. In various embodiments, the primary tank, the secondary tank 502, 602, or both tanks may include a drain port 504, 604.

In various embodiments, a valve 108 may be configured with various amounts of travel or throw between an on position and an off position. For example, a valve 108 may turn on when the liquid level 112 falls below a first threshold level, and may turn off when the liquid level 112 rises to a second threshold level, which may be one inch above the first threshold level, two inches above the first threshold level, or the like. Space in the container 106 below the lowest level to which the float 110 travels (or otherwise below both the threshold levels for turning the valve 108 on and off) may not affect the valve 108 turning on or off. In certain embodiments, commercially available valves 108 may have a fixed amount of travel or throw between on and off positions. Thus, increasing or decreasing the run time for an apparatus 100 with such a valve 108 may involve increasing or decreasing the width of the container 106 so that the liquid level 112 rises more slowly or more quickly, which may also affect the off time for an apparatus 100 (e.g., the time from when the valve 108 turns off to when it turns on again). Alternatively, increasing or decreasing the run time for an apparatus 100 may involve adjusting the fill rate of the container 106 via a return flow control device 210 along the return line 212.

Accordingly, in certain embodiments, a secondary tank 502, 602 may determine the run time for the apparatus 100 independently of the off time for the apparatus 100. When the valve 108 is off, liquid may drain through the drain port 504, 604, so that the secondary tank 502, 602 is empty (e.g., if the ground 218 is dry). When the valve 108 is on, liquid may enter the secondary tank 502, 602 from the return line 212 and may simultaneously exit the secondary tank 502, 602 via the drain port 504, 604. The drain port 504, 604, may be configured with a drain rate less than the flow rate in the return line 212, so that the secondary tank 502, 602 fills slowly (compared to a similar tank without a drain port 504, 604).

When the secondary tank 502, 602 fills to the level of a spillway 506, liquid in the secondary tank 502, 602 may enter the primary tank via the spillway 506. Thus, in certain embodiments, the secondary tank 502, 602 increases run time for the apparatus 100, so that the run time includes the time to initially fill the secondary tank 502, 602. Additionally, in some embodiments, the fill rate for the primary tank may be decreased based on the drain rate through the drain port 504, 604. In certain embodiments, the increased run time based on the secondary tank 502, 602, is independent of the off time, which is based on the liquid level 112 falling in the primary tank. Additionally, if the ground 218 is wet or saturated, the secondary tank 502, 602 may be incompletely drained (or may be full of groundwater) when the valve 108 turns on, thus decreasing run time in already wet conditions.

In FIG. 5, the secondary tank 502 is disposed to the side of the primary tank. In certain embodiments, a secondary tank 502 to the side of the primary tank may be convenient to maintain. For example, in a portable, above-ground apparatus 100, the drain port 504 for the secondary tank 502 may be easily adjustable by a user.

In FIG. 6, the secondary tank 602 is disposed surrounding the primary tank. As described above, in a container 106 without a secondary tank 602, the volume of the container 106 below the threshold for turning the valve 108 on may not affect the run time of the apparatus 100, while the width of the container 106 may affect both the run time and the off time. A secondary tank 602 may extend below the primary tank, so that the volume underneath the primary tank can be used to provide an extended run time independent of the off time. By contrast, widening the container 106 to extend the run time may also extend the off time, and may increase the footprint of the apparatus 100.

Thus, in certain embodiments, an apparatus 100 with a secondary tank 602 surrounding the primary tank may be significantly narrower than an apparatus 100 that provides a comparable run time without a secondary tank 602, for a valve 108 with the same travel or throw between on and off positions. For example, in some embodiments, a single-container apparatus 100 may be eighteen inches in diameter to provide a desired run time, but a similar apparatus 100 with a secondary tank 602 may provide the same run-time with a taller secondary tank 602 and an overall diameter of six inches. A narrower apparatus 100 using a secondary tank 602 may be unobtrusive, or conveniently concealed among landscaping.

Figure 7:
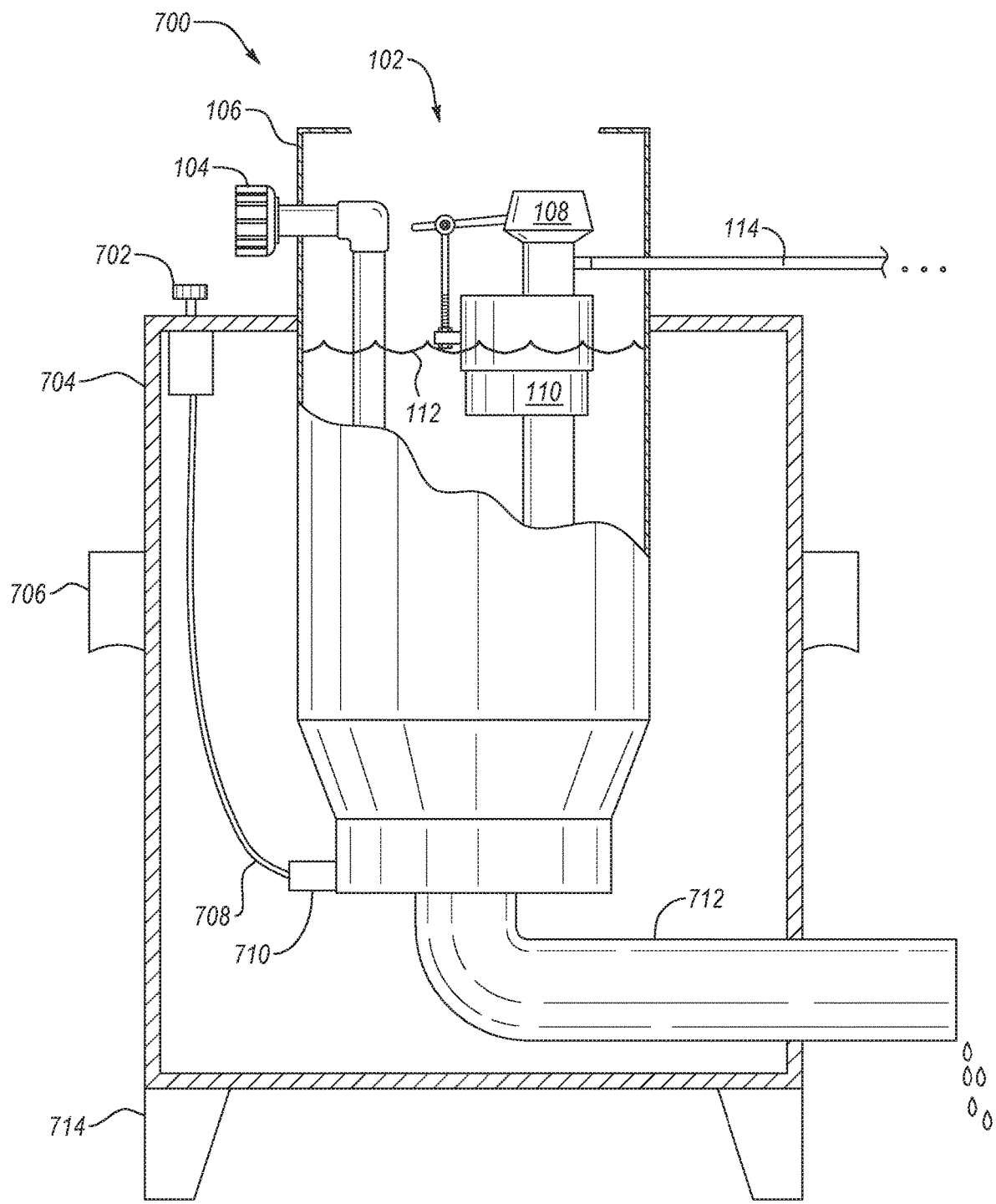
FIG. 7 is a side view illustrating one embodiment of a system for fluid flow control.

FIG. 7 depicts one embodiment of a system 700 for fluid flow control. The system 700, in certain embodiments, may include a container 106, a valve 108 and an output line 114, substantially as described above with regard to the apparatus 100. Additionally, in the depicted embodiment, the system 700 includes a portable receptacle 704.

In some embodiments, the apparatus 100 described above may be installed in the ground 218 for long-term fluid flow control. In certain embodiments, a portable, above-ground system 700 may be used for temporary fluid flow control. For example, a sprinkler system for a building may include electronic valve controls, but the electronic valve controls may not be operable if an electric permit has not yet been granted for the building. Accordingly, in some embodiments, a portable system 700 may be used to irrigate landscaping before electricity is available, and without burdensome manual control to adjust sprinkler on and off times to different circumstances or weather conditions.

A portable receptacle 704 in various embodiments, may be a box, a canister, a bucket, or the like, for carrying the container 106 and valve 108. In certain embodiments, the container 106 and the valve 108 may be disposed in the portable receptacle 704. The output line 114, in further embodiments, may be coupled to the valve 108 in the portable receptacle 704, and may convey fluid flow from the valve 108 to a location 116 outside the container 106, which may also be outside the portable receptacle 704. In further embodiments, a portable receptacle 704 may include carry handles 706, and/or legs 714 allowing the system 700 to be set up on landscaping without crushing an area of a lawn, or other plants.

In certain embodiments, a system 700 may include a manual override, as described above. In the depicted embodiment, the manual override includes a drain 710, operable to drain liquid from the container 106. Liquid exiting the drain 710 is conveyed out of the portable receptacle 704 by a drain pipe 712. In another embodiment, liquid may drain from the container 106 directly underneath portable receptacle 704. In the depicted embodiment, the drain 710 is operable by a user via a button or plunger 702 and a linkage 708 coupling the button or plunger 702 to the drain 710. In another embodiment, a drain 710 may be operable by a user reaching in to the portable receptacle 704 without a linkage 708 for a button or plunger 702 exterior to the portable receptacle 704.

Figure 8:
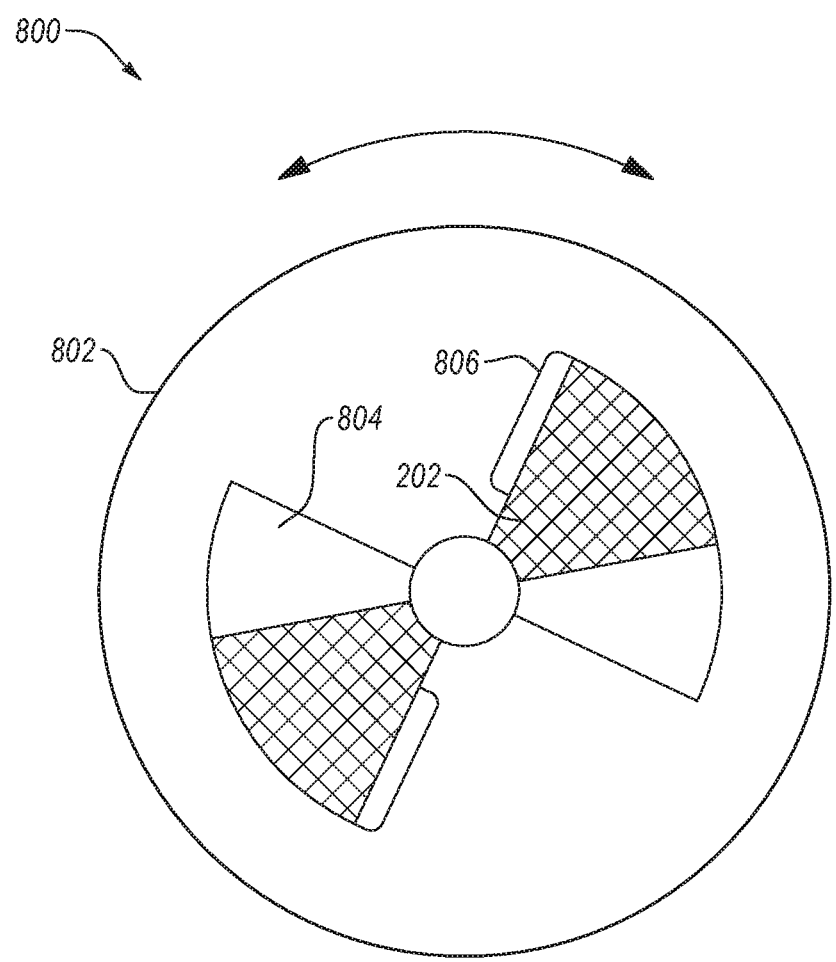
FIG. 8 is a top view illustrating one embodiment of a user-adjustable aperture.

FIG. 8 depicts one embodiment of a user-adjustable aperture 800. A user-adjustable aperture 800, in certain embodiments, may be used with an apparatus 100 or system 700 as described above. In certain embodiments, an outlet 102 allowing liquid to exit a container 106 may allow the liquid to exit via evaporation, and may include a mesh 202 as described above with regard to FIG. 2, and/or a user-adjustable aperture 800.

A user-adjustable aperture 800, in various embodiments, may be an aperture or opening for which the size is adjustable by a user to adjust an evaporation rate through the outlet 102. In the depicted embodiment, the user-adjustable aperture 800 includes a lower plate 804 with openings, through which the mesh 202 is seen. In another embodiment, a user-adjustable aperture 800 may be used without mesh 202.

In the depicted embodiment, the user-adjustable aperture 800 further includes an upper plate 802 with openings corresponding to openings in the lower plate 804. The upper plate 802 is rotatably connected to the lower plate 804 at a central pivot point. A user may use tabs 806, protrusions, or handles to rotate the upper plate 802 relative to the lower plate 804. (Directions of rotation are indicated by a double-headed arrow). In a fully open position, the openings in the upper plate 802 are fully aligned with openings in the lower plate 804, allowing liquid to evaporate through the openings. In a fully closed position, the openings in the upper plate 802 are aligned with non-open portions of the lower plate 804, and liquid is blocked from evaporating through the user-adjustable aperture 800. In a partially open position, the openings in the upper plate 802 are partially aligned with non-open portions of the lower plate 804, which may permit evaporation, but at a lower rate than when the user-adjustable aperture 800 is in a fully open position.

A user may, in certain embodiments, rotate the upper plate 802 to a position at or between the fully open and fully closed positions, to control the effective size of the outlet 102, thereby controlling the rate at which liquid evaporates from the container 106. Controlling the rate at which liquid evaporates from the container 106, may in turn, control controlling the off time for the valve 108.

Figure 9:
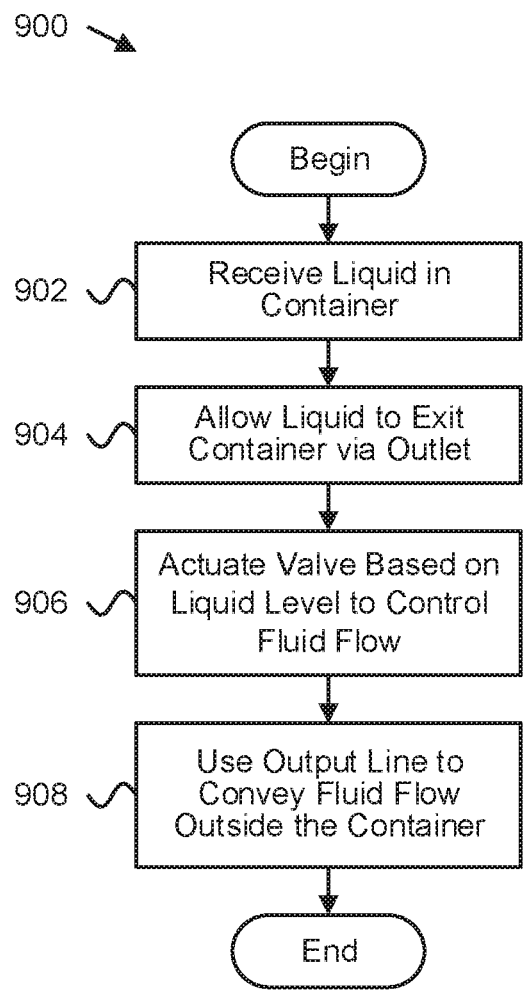
FIG. 9 is a schematic flow chart diagram illustrating one embodiment of a method for fluid flow control.

FIG. 9 is a flow chart diagram illustrating one embodiment of a method 900 for fluid flow control. The method 900 begins, and a container 106 receives 902 liquid. The container 106 includes an outlet 102. The outlet 102 allows 904 the liquid to exit the container 106. A valve 108 actuates 906 based on a liquid level 112 in the container 106, to control a fluid flow. An output line 114 coupled to the valve 108 conveys 908 the fluid flow from the valve 108 to a location 116 outside the container 106, and the method 900 ends. The location 116 outside the container 106 does not receive the liquid directly from the outlet 102.

Figure 10:
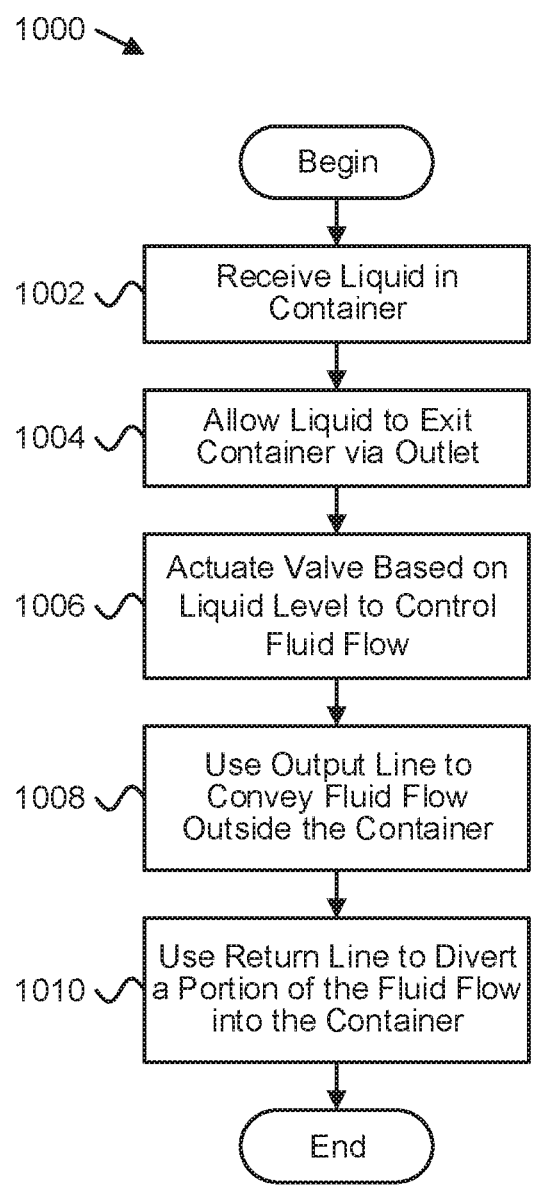
FIG. 10 is a schematic flow chart diagram illustrating another embodiment of a method for fluid flow control.

FIG. 10 is a schematic flow chart diagram illustrating another embodiment of a method 1000 for fluid flow control. The method 1000 begins, and a container 106 receives 1002 liquid. The container 106 includes an outlet 102. The outlet 102 allows 1004 the liquid to exit the container 106. A valve 108 actuates 1006 based on a liquid level 112 in the container 106, to control a fluid flow. An output line 114 coupled to the valve 108 conveys 1008 the fluid flow from the valve 108 to a location 116 outside the container 106. The location 116 outside the container 106 does not receive the liquid directly from the outlet 102. A return line 212 coupled to the output line 114 diverts 1010 a portion of the fluid flow from the output line 114 into the container 106, and the method 1000 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a container shaped to receive a liquid, the container comprising an outlet configured to allow the liquid to exit the container;
   a valve configured to control a fluid flow based on a liquid level in the container;
   an output line coupled to the valve, the output line configured to convey the fluid flow from the valve to a location outside the container, wherein the location outside the container does not receive the liquid directly from the outlet;
   a return line branching off from the output line, the return line configured to divert a portion of the fluid flow from the output line into the container; and
   a return flow control device connected to the return line to control a fill rate for the container, the return flow control device comprising a valve adjustable by a user to adjust the fill rate for the container.

2. The apparatus of claim 1, further comprising a branch connector that couples the return line to the output line between the valve and the location outside the container.

3. The apparatus of claim 1, wherein the return line is coupled to the output line after the location outside the container, such that fluid not used at the location is returned to the container.

4. The apparatus of claim 1, further comprising
   an output flow control device disposed in fluid communication with the output line to control an output rate for delivering fluid to the location.

5. The apparatus of claim 1, wherein the container comprises a primary tank and a secondary tank in fluid communication with the primary tank, the secondary tank comprising a drain port, the secondary tank receiving the diverted portion of the fluid flow.

6. The apparatus of claim 1, further comprising one or more sprinklers coupled to the output line.

7. The apparatus of claim 1, wherein the outlet comprises an opening configured to allow the liquid to exit the container via evaporation, the outlet further comprising one or more of:
  a user-adjustable aperture configured to adjust an evaporation rate; and
  a mesh covering the outlet.

8. The apparatus of claim 1, wherein the apparatus is configured to be disposed in ground, and the outlet comprises a permeable material configured to allow the liquid to pass between the container and the ground.

9. The apparatus of claim 1, further comprising a sleeve shaped to receive the container, the sleeve configured to be disposed in ground.

10. The apparatus of claim 1, wherein the outlet comprises a drain for the container.

11. The apparatus of claim 1, further comprising a manual override, the manual override comprising one or more of:
  a drain valve operable by a user to drain the container; and
  a fill valve operable by a user to fill the container.

12. The apparatus of claim 1, further comprising a liquid level indicator that indicates the liquid level in the container.

13. The apparatus of claim 1, further comprising a valve latch configured to delay the valve from opening.

14. The apparatus of claim 1, wherein the valve is mechanically actuated based on the liquid level, such that the apparatus does not use electricity.

15. A system comprising:
  a portable receptacle;
  a container disposed in the portable receptacle and shaped to receive a liquid, the container comprising an outlet configured to allow the liquid to exit the container;
  a valve disposed in the portable receptacle and configured to control a fluid flow based on a liquid level in the container;
  an output line coupled to the valve, the output line configured to convey the fluid flow from the valve to a location outside the container, wherein the location outside the container does not receive the liquid directly from the outlet;
  a return line branching off from the output line, the return line configured to divert a portion of the fluid flow from the output line into the container; and
  a return flow control device connected to the return line to control a fill rate for the container, the return flow control device comprising a valve adjustable by a user to adjust the fill rate for the container.

16. The system of claim 15, further comprising one or more sprinklers coupled to the output line.

17. A method comprising:
  receiving a liquid in a container, the container comprising an outlet;
  allowing the liquid to exit the container via the outlet;
  actuating a valve based on a liquid level in the container, to control a fluid flow; and
  using an output line coupled to the valve to convey the fluid flow from the valve to a location outside the container, wherein the location outside the container does not receive the liquid directly from the outlet;
  using a return line that branches off from the output line to divert a portion of the fluid flow from the output line into the container; and
  adjusting a valve connected to the return line to control a fill rate for the container.

* * * * *